US011237776B2

(12) United States Patent
Nagai

(10) Patent No.: US 11,237,776 B2
(45) Date of Patent: Feb. 1, 2022

(54) IMAGE FORMING APPARATUS AND IMAGE FORMING METHOD FOR SELECTIVELY OUTPUTTING IMAGES WITH ADDITIONAL INFORMATION

(71) Applicant: SHARP KABUSHIKI KAISHA, Sakai (JP)

(72) Inventor: Yuhsuke Nagai, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/115,011

(22) Filed: Dec. 8, 2020

(65) Prior Publication Data

US 2021/0173598 A1 Jun. 10, 2021

(30) Foreign Application Priority Data

Dec. 9, 2019 (JP) .............................. JP2019-222148

(51) Int. Cl.
*G06F 3/12* (2006.01)

(52) U.S. Cl.
CPC .......... *G06F 3/1222* (2013.01); *G06F 3/1238* (2013.01)

(58) Field of Classification Search
None
See application file for complete search history.

(56) References Cited

U.S. PATENT DOCUMENTS

| 5,235,681 | A | * | 8/1993 | Masuzaki | ............... | G06F 16/40 |
| | | | | | | 345/556 |
| 7,027,179 | B2 | | 4/2006 | Mori | | |
| 7,239,418 | B2 | | 7/2007 | Mori | | |
| 7,751,080 | B2 | | 7/2010 | Mori | | |
| 2001/0049666 | A1 | * | 12/2001 | Prakken | .................. | G06F 21/10 |
| | | | | | | 705/59 |

FOREIGN PATENT DOCUMENTS

| JP | 2001-328325 A | | 11/2001 |
| JP | 2010-41562 A | | 2/2010 |
| KR | 20080030815 A | * | 4/2008 |

OTHER PUBLICATIONS

English Translation of Korean Publication 10-2008-0030815. (Year: 2008).*

* cited by examiner

*Primary Examiner* — Thomas D Lee
(74) *Attorney, Agent, or Firm* — ScienBiziP, P.C.

(57) ABSTRACT

An image forming apparatus includes a controller, a storage, and a display, and upon output of an image for printing based on print data, the controller stores the print data in the storage and selectively outputs an image for printing, and if the print data includes identification information for identifying the image for printing, the controller outputs the identification information together with the image for printing. In the image forming apparatus, when an image for printing based on print data selected by a user is displayed on the display, the controller restricts an output process so that the image for printing is displayed only if the identification information is not included in the print data.

5 Claims, 18 Drawing Sheets

IMAGE FORMING APPARATUS AND IMAGE FORMING METHOD FOR SELECTIVELY OUTPUTTING IMAGES WITH ADDITIONAL INFORMATION

BACKGROUND OF THE INVENTION

Field of the Invention

The present invention relates to an image forming apparatus and the like, and particularly relates to an image forming apparatus and the like capable of storing print data in a storage, and selectively outputting an image for printing, and if additional information is included in the print data, outputting the additional information together with the image for printing.

Description of the Background Art

In recent years, there is known an image forming apparatus having, to avoid the problem of leakage of printing matter, a function of temporarily saving an image for printing in the apparatus upon outputting the printing matter, and executing printing when the user performs an operation on the front of the image forming apparatus (see Japanese Unexamined Patent Application Publication No. 2010-41562).

Further, there is known an image forming apparatus having a function (watermark printing) of inserting, upon outputting a printing matter, a specific character string such as "Internal Use Only" or "Strictly Confidential" by watermark printing onto the background (see Japanese Unexamined Patent Application Publication No. 2001-328325).

Japanese Unexamined Patent Application Publication No. 2010-41562 discloses a technique in which an image forming apparatus allows for confirmation of a print image by preview display before printing, and performs preview display of a print image with a stamp as additional information such as "Strictly Confidential" or the like.

In Japanese Unexamined Patent Application Publication No. 2001-328325, there is disclosed a technique in which, to add a specific character string such as "Internal Use Only" or "Strictly Confidential" to a printing matter as identification information, the character string such as "Internal Use Only" or "Strictly Confidential" specified in an image forming apparatus is printed instead of being stamped at the specified location in the print data created by the user.

In the prior art, if a user stores the print data without specifying the storage destination and executes the printing process, the print data is saved in a shared folder or a temporary storage folder of a storage.

However, if a password is not set for the print data saved in the shared folder or the temporary storage folder, usually, all users can view the contents of the printing matter via a preview function.

Therefore, in the case of print data for which no password is set, even if the print data has a watermark or a stamp such as "Internal Use Only" or "Strictly Confidential", there is a problem that the print data is viewed by users other than the user who outputs the print data by the preview function.

The present invention has been made in view of the above-mentioned conventional problems, and an object thereof is to provide an image forming apparatus and the like capable of reducing the risk of information leakage of highly confidential printing matter upon performing an output process.

SUMMARY OF THE INVENTION

An image forming apparatus according to the present invention includes a controller, a storage, and a display. In the image forming apparatus, upon output of an image for printing based on print data, the controller stores the print data in the storage and selectively outputs an image for printing, and if the print data includes identification information (for example, a watermark, stamp print) for identifying the image for printing (for example, a printed document or the like), the controller can output the identification information together with the image for printing. In the image forming apparatus, when an image for printing based on print data selected by a user is displayed on the display, the controller restricts an output process so that the image for printing based on the print data is displayed only if the identification information is not included in the print data selected by the user.

An image forming method according to the present invention includes, in outputting of an image for printing based on print data, storing the print data in a storage, outputting the image for printing based on the print data selected by a user, and if the print data includes identification information for identifying the image for printing, outputting the identification information together with the image for printing. The image forming method further includes, when the image for printing based on the print data selected by the user is displayed on a display, restricting output so that the image for printing based on the print data is displayed only if the identification information is not included in the print data selected by the user.

According to the image forming apparatus and the like of the present invention, by displaying, upon a printing process, only an image for printing based on print data that does not include identification information on an operation screen of a display, print data including identification information is not selected and printed easily, and therefore, it is possible to provide an image forming apparatus and the like capable of reducing the risk of information leakage of highly confidential printing matter.

DESCRIPTION OF THE PREFERRED EMBODIMENTS

First Embodiment

A first embodiment of the present invention will be described below with reference to the drawings.

Figure 1:
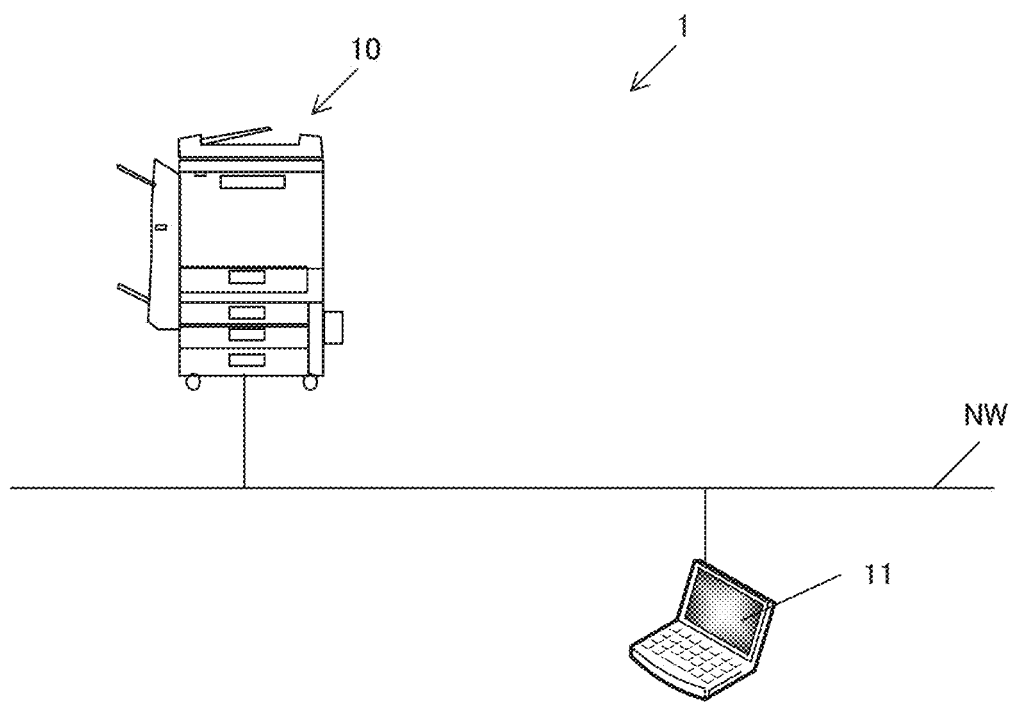
FIG. 1 is an explanatory diagram illustrating an overall configuration of a printing system including an image forming apparatus according to a first embodiment.
Figure 2:
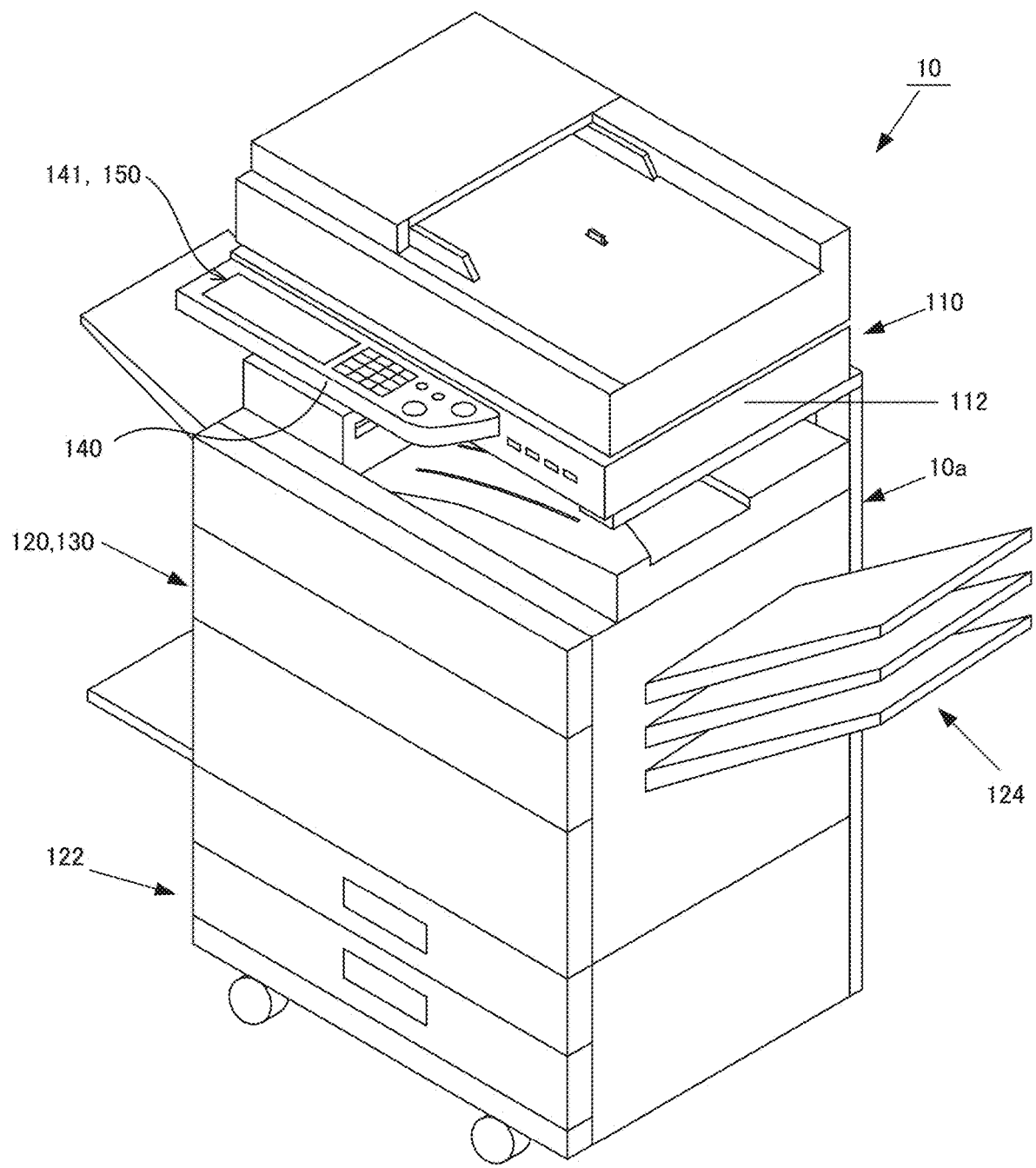
FIG. 2 is an explanatory illustrating a configuration of the image forming apparatus.
Figure 3:
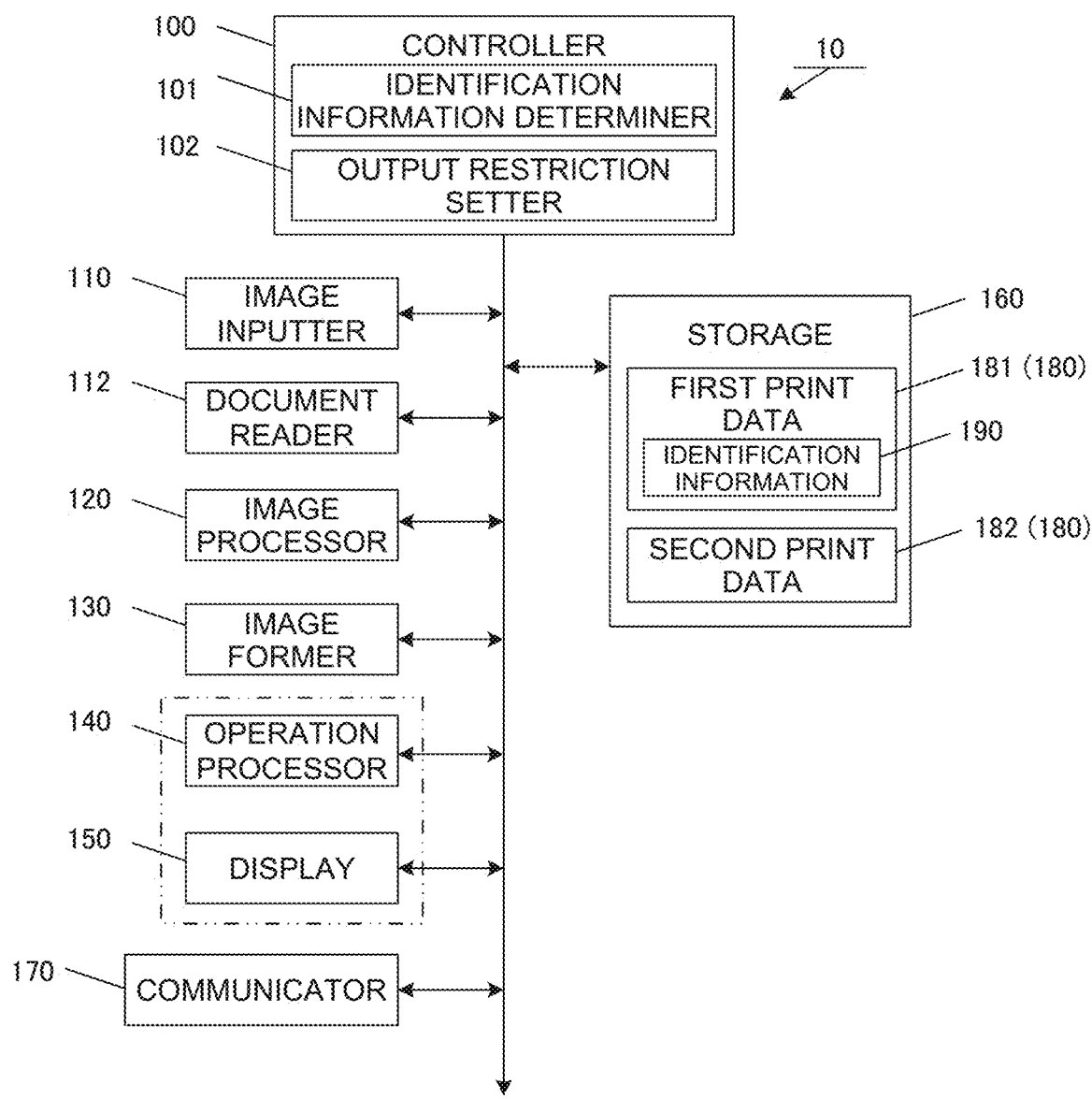
FIG. 3 is a block diagram illustrating a configuration of the image forming apparatus.
Figure 4:
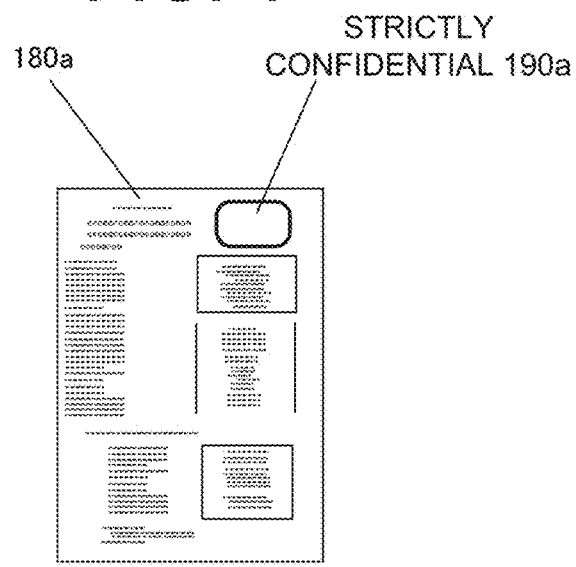
FIG. 4 is an explanatory diagram illustrating an example of an image for printing based on print data.
Figure 5:
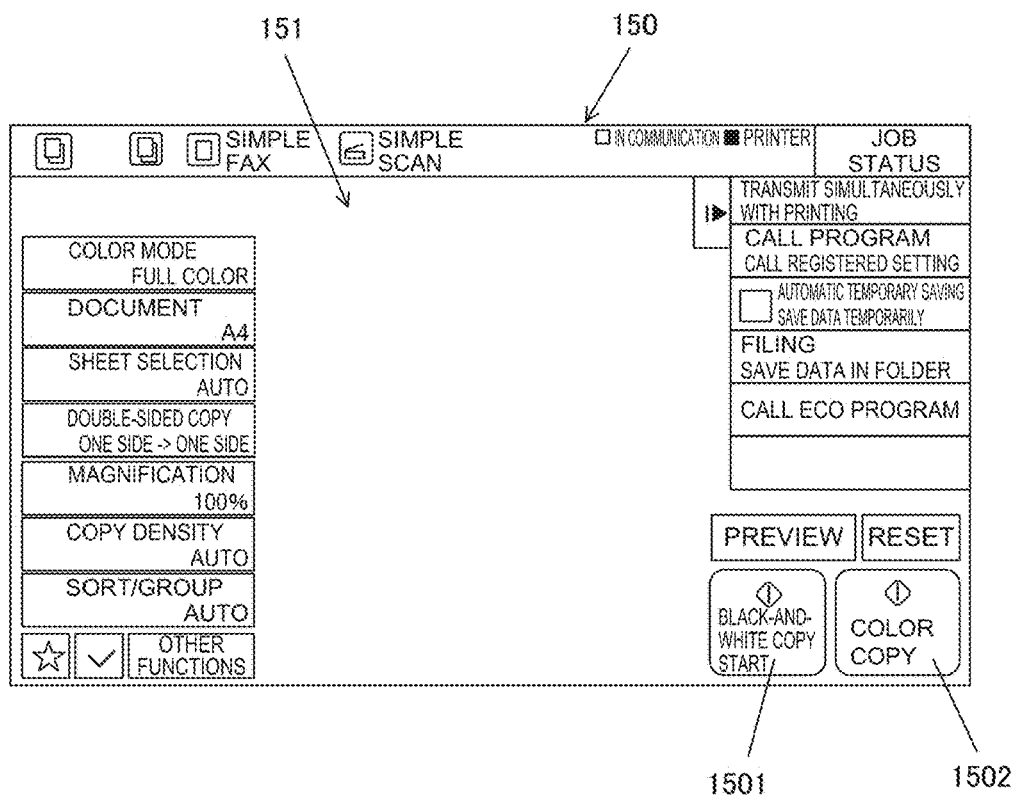
FIG. 5 is an explanatory diagram illustrating an example of an operation screen displayed on a display included in the image forming apparatus.

FIG. 1 is an example of an embodiment of the invention, and is an explanatory diagram illustrating an overall configuration of a printing system including an image forming apparatus according to the first embodiment of the present invention, FIG. 2 is an explanatory diagram illustrating a configuration of the image forming apparatus, FIG. 3 is a block diagram illustrating a configuration of the image forming apparatus, FIG. 4 is an explanatory diagram illustrating an example of an image for printing based on print data, and FIG. 5 is an explanatory diagram illustrating an example of an operation screen displayed on a display included in the image forming apparatus.

Configuration of Printing System

As illustrated in FIG. 1, the first embodiment is a printing system 1 in which an image forming apparatus 10 and a terminal device 11 are communicably connected via a network NW.

Configuration of Image Forming Apparatus

As illustrated in FIG. 3, the image forming apparatus 10 according to the first embodiment is an image forming apparatus in which, upon outputting an image for printing based on print data 180, a controller 100 stores the print data 180 in a storage 160, and in response to an output instruction, selectively outputs the image for printing based on the print data 180 stored in the storage 160, and if the print data 180 includes identification information 190 such as a watermark, stamp print, or the like for identifying the image for printing, the controller outputs the identification information together with the image for printing.

According to the first embodiment, in the image forming apparatus 10, upon displaying the image for printing based on the print data 180 selected by the user on a display 150, the controller 100 restricts the output so that the image for printing based on the print data 180 is displayed only if the identification information 190 is not included in the print data 180 selected by the user.

First, an overall configuration of the image forming apparatus 10 according to the first embodiment will be described.

As illustrated in FIG. 2, the image forming apparatus 10 is a multifunctional apparatus for electrophotographically outputting an image and includes, in the upper part of the apparatus main body 10a, a document reader 112 that reads an image in a document.

As illustrated in FIG. 3, the image forming apparatus 10 mainly includes the controller 100, an image inputter 110, the document reader 112, an image processor 120, an image former 130, an operation processor 140, the display 150, the storage 160, and a communicator 170.

The controller 100 is a functional element that controls the entire image forming apparatus 10.

Moreover, the controller 100 realizes various functions by reading and executing various programs, and includes, for example, one or more arithmetic devices (for example, a Central Processing Unit (CPU)).

The image inputter 110 is a functional element that reads image data input to the image forming apparatus 10. Moreover, the image inputter 110 is coupled to the document reader 112 being a functional element that reads an image in a document, and receives image data output from the document reader 112.

The image inputter 110 may receive image data from a storage medium such as a USB memory and an SD card. Further, the image inputter 110 may receive image data from another terminal device via a communicator 170 that connects the image inputter 110 with the other terminal device.

The document reader 112 has a function of optically reading a document placed on a contact glass (not illustrated) and passing the scan data to the image former 130.

The image processor 120 has a function of converting to a set file format (such as TIFF, GIF, JPEG, or the like), based on the image data read by the document reader 112. In addition, the image processor 120 forms an output image, based on the image data on which an image process is performed.

The image former 130 is a functional element that forms, on a recording medium (for example, a recording sheet), output data based on the image data. For example, as illustrated in FIG. 2, a recording sheet is fed from an automatic sheet feed tray 122, and, in the image processor 120, an image is formed on a surface of the recording sheet, and then the sheet is ejected to a sheet discharge tray 124. The image processor 120 includes, for example, an electrophotographic laser printer.

The operation processor 140 is a functional element that receives operational instructions from a user, and includes various key switches, a device that detects a touch input, and the like. The user uses the operation processor 140 to input a function to be used and an output condition.

The display 150 is a functional element that displays various types of information to the user, and includes, for example, a Liquid Crystal Display (LCD).

That is, the operation processor 140 provides a user interface for operating the image forming apparatus 10, and the display 150 displays various setting menu screens and messages of the image forming apparatus 10.

The image forming apparatus 10 may include, as a configuration of the operation processor 140, a touch panel in which an operation panel 141 and the display 150 are integrally formed, as illustrated in FIG. 2. In this case, a method of detecting an input on the touch panel may be a common detection method such as a resistive method, touch screen technology utilizing infrared or electromagnetic induction, or a capacitive method.

The storage 160 is a functional element that stores various programs including a control program necessary for the operation of the image forming apparatus 10, various data including the read data, and user information. The storage 160 includes, for example, a non-volatile Read Only Memory (ROW a Random Access Memory (RAM), a Hard Disk Drive (HDD), or the like. The storage 160 may also include a Solid State Drive (SSD) being a semiconductor memory.

A computer program for realizing a general operation of the image forming apparatus 10 is stored in the ROM. The ROM further stores screen data for displaying various setting screens and the like to be displayed on the operation processor 140.

The RAM provides a function as a working memory for temporarily storing the results of an arithmetic process by the CPU in the controller 100, and a function as a frame memory for storing image data.

The HDD temporarily stores various data such as image data scanned by the document reader 112.

The communicator 170 is communicably connected to the terminal device 11 and the like via the network NW.

Characteristic Configuration of image Forming Apparatus

In the image forming apparatus 10 according to the first embodiment, the storage 160 stores print data 180 to be printed.

As the print data 180, as illustrated in FIG. 3, first print data 181 including the identification information 190 for identifying the printed document, and second print data 182 not including the identification information 190 are stored.

The controller 100 includes an identification information determiner 101 and an output restriction setter 102.

The identification information determiner 101 determines whether the print data 180 stored in the storage 160 includes the identification information 190.

If it is determined that the print data 180 includes the identification information 190, the output restriction setter 102 restricts the preview display of the image for printing based on the print data 180.

In the first embodiment, for example, as illustrated in FIG. 4, if the image for printing 180a based on the print data 180 includes an identification image 190a such as a "Strictly Confidential" stamp based on the identification information 190, the output restriction setter 102 is set so that a preview display is not performed on the operation screen 151 of the display 150, as illustrated in FIG. 5.

The reference numeral 1501 denotes a black-and-white copy start button, and 1502 denotes a color copy start button.

Processing of Image for Printing Based on Print Data

Next, in the image forming apparatus 10 according to the first embodiment, the processing of the image for printing based on the received print data will be described with reference to a flowchart.

Figure 6:
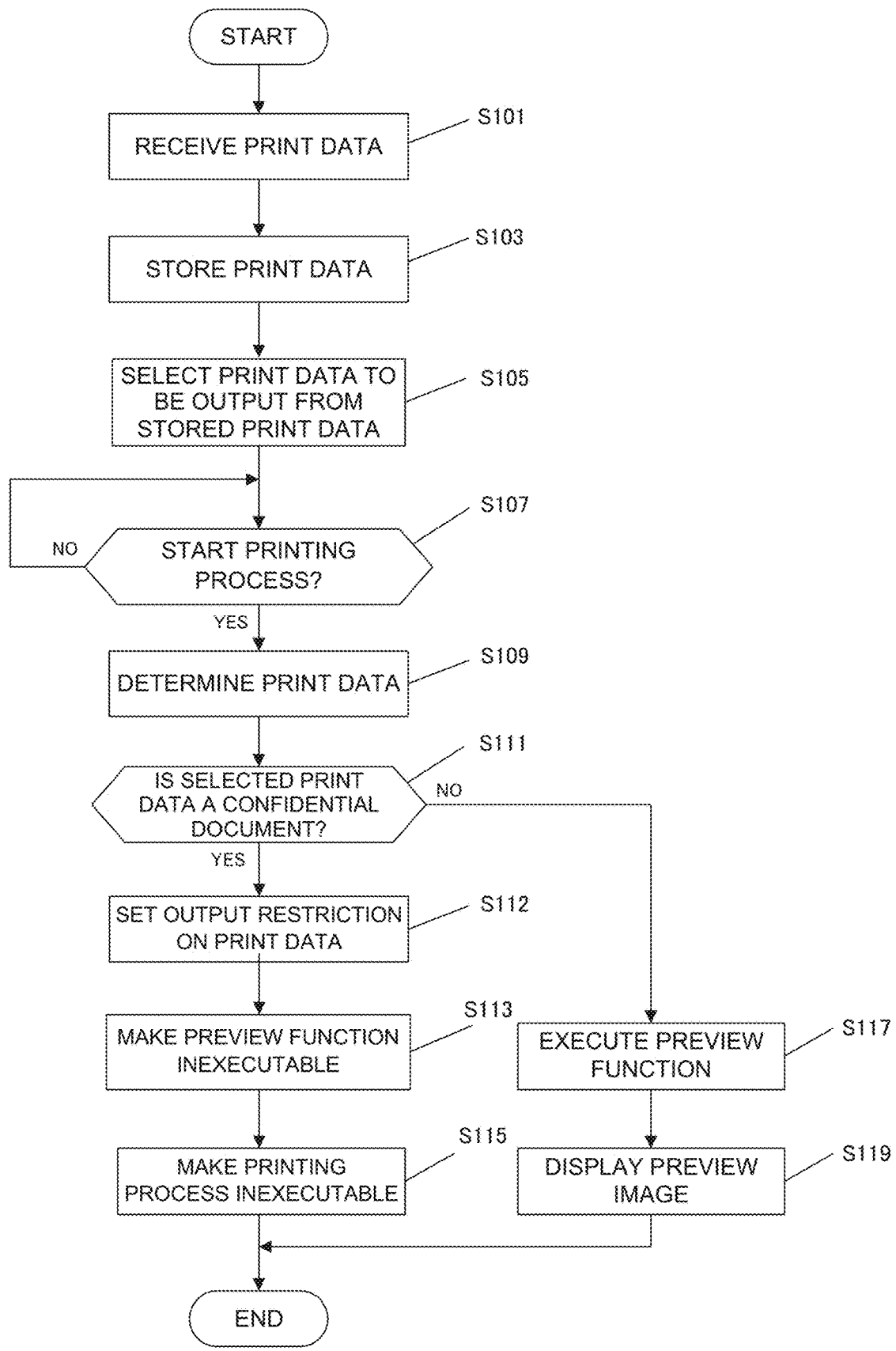
FIG. 6 is a flowchart illustrating an example of an output process of an image for printing based on print data received in the image forming apparatus.
Figure 7:
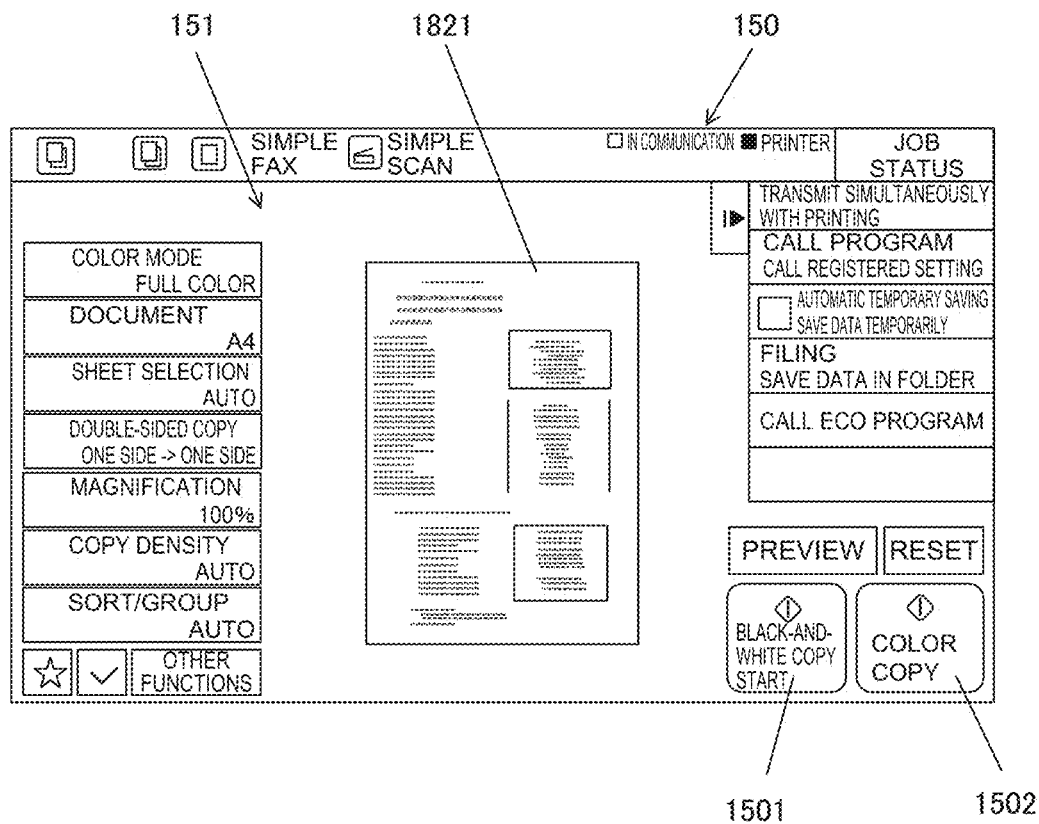
FIG. 7 is an explanatory diagram illustrating an example of a preview display displayed on the display included in the image forming apparatus.

FIG. 6 is a flowchart illustrating an example of an output process of an image for printing based on print data received in the image forming apparatus according to the first embodiment, and FIG. 7 is an explanatory diagram illustrating an example of a preview display displayed on a display included in the image forming apparatus.

In the first embodiment, the image forming apparatus 10 displays a preview image of the image for printing on the display 150 before the printing process of the image for printing based on the received print data is executed.

As illustrated in FIG. 6, if the print data 180 is received in the image forming apparatus 10 (step S101), the print data 180 is stored in the storage 160 (step S103).

If the printing process is executed, the print data 180 stored in the storage 160 is displayed on the display 150 of the image forming apparatus 10, and the print data 180 to be printed is selected from the displayed print data 180 (step S105).

Once the printing process is started (step S107), the identification information determiner 101 of the controller 100 determines the selected print data 180 to be printed (step S109).

The identification information determiner 101 determines whether the print data 180 selected by the user is a confidential document including identification information 190 such as a "Strictly Confidential" stamp for identifying that the print data 180 is a highly confidential document (step S111).

In step S111, if it is determined that the print data 180 is a confidential document including the identification information 190, the print data 180 is determined to be the first print data 181 with high confidentiality and a restriction is set on the preview display or printing of the image for printing (step S112). Also, the preview function for performing a preview display (step S113) becomes inexecutable, and the printing process becomes inexecutable (step S115).

On the other hand, in step S111, if it is determined that the print data 180 is not a confidential document including the identification information 190, the print data 180 is determined to be the second print data 182 not having high confidentiality the preview function is executed (step S117), and as illustrated in FIG. 7, a preview image 1821 of the image for printing based on the second print data 182 is displayed on the operation screen 151 of the display 150 (step S119).

In this way, the output process ends.

According to the first embodiment, in the image forming apparatus 10 configured as described above, by including the identification information determiner 101 and the output restriction setter 102 in the controller 100, if the print data 180 selected by the user is the first print data 181 with high confidentiality including the identification information 190, the output is restricted and an output process for performing preview display and printing becomes inexecutable, and by allowing the execution of the output process only if the print data 180 is the second print data 182 not including the identification information 190, it is possible to reduce the risk of information leakage of highly confidential printing matter.

Second Embodiment

Next, a second embodiment will be described.

In the second embodiment, in addition to the configuration of the image forming apparatus 10 of the first embodiment, as a function of the output restriction setter 102 included in the controller 100, if it is determined that the print data 180 to be selected includes the identification information 190, upon preview display of the image for printing based on the first print data 181, an output restriction is applied to at least a part of the image for printing based on the first print data 181 including the identification information 190.

Figure 8:
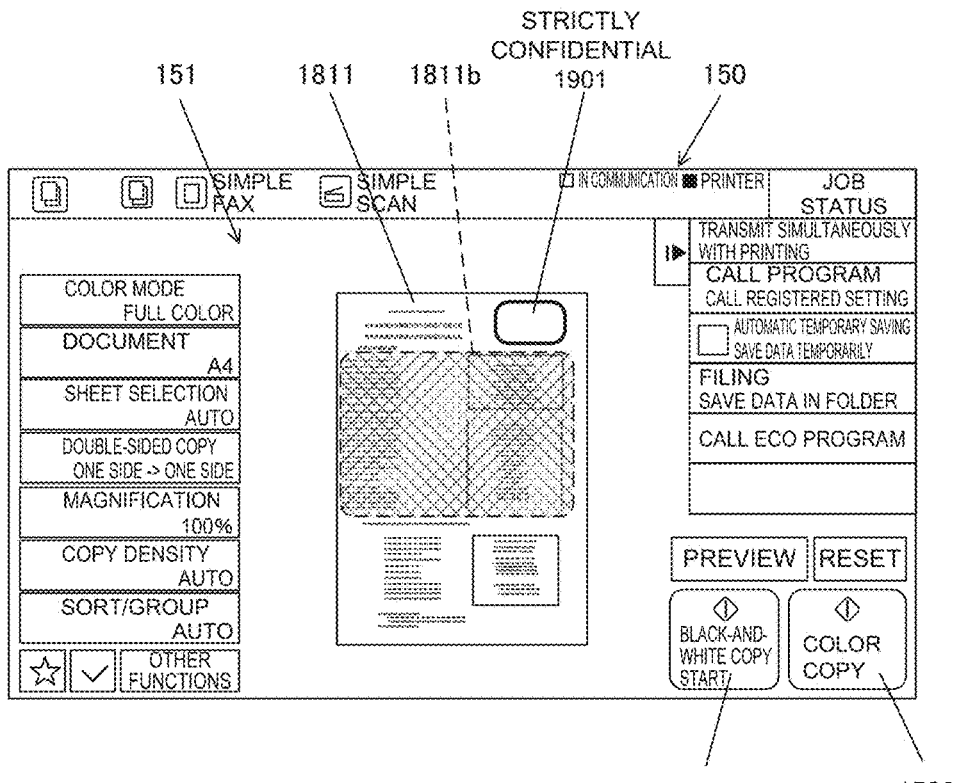
FIG. 8 is an explanatory diagram illustrating an example of a preview display displayed on a display included in an image forming apparatus according to a second embodiment.
Figure 9:
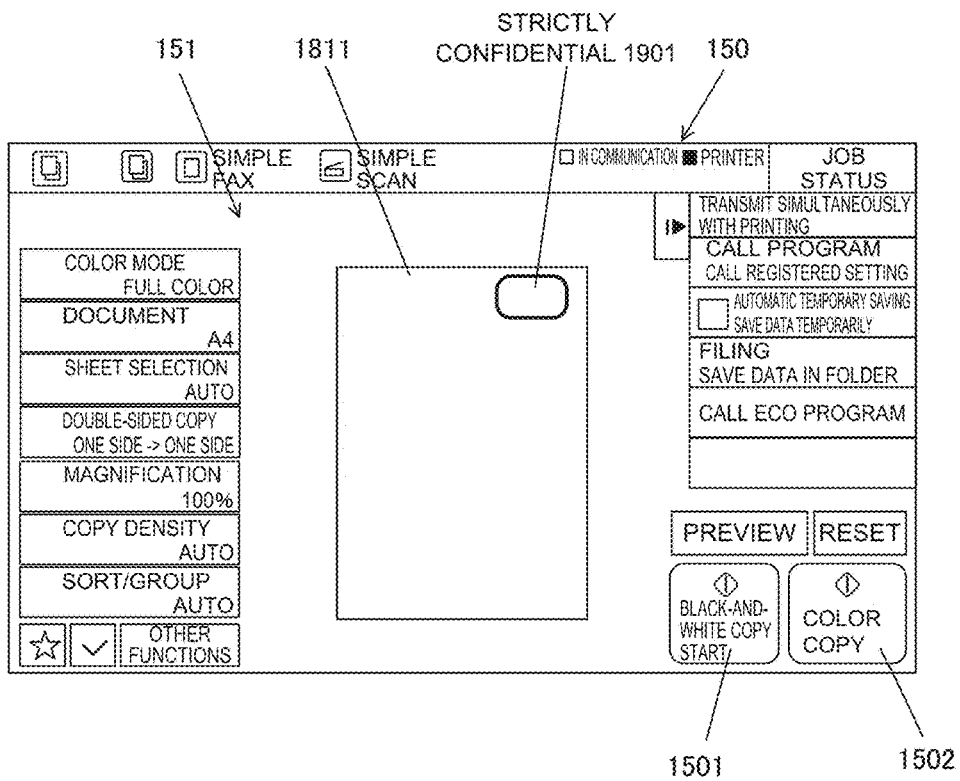
FIG. 9 is an explanatory diagram illustrating a modification of the preview display displayed on the display.
Figure 10:
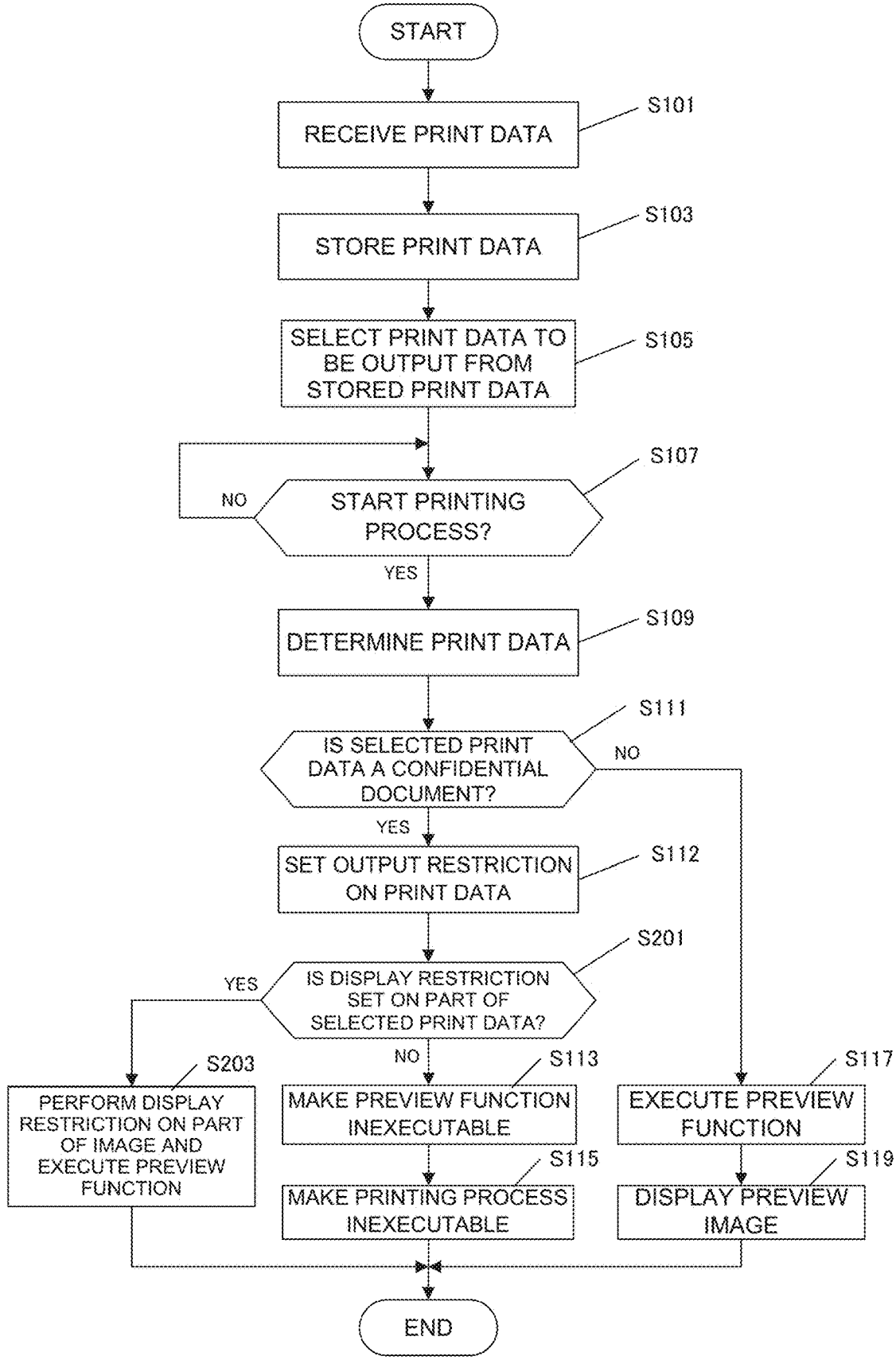
FIG. 10 is a flowchart illustrating an example of an output process of an image for printing based on print data received in the image forming apparatus.

FIG. 8 is an explanatory diagram illustrating an example of a preview display displayed on a display included in an image forming apparatus according to the second embodiment, FIG. 9 is an explanatory diagram illustrating a modification of the preview display displayed on the display, and FIG. 10 is a flowchart illustrating an example of an output process of an image for printing based on print data received in the image forming apparatus.

In the second embodiment, for the convenience of explanation, the configuration that is the same as that of the image forming apparatus 10 of the first embodiment is designated by using the same reference numerals, and the description thereof will be omitted.

In the second embodiment, even if the print data 180 received in the image forming apparatus 10 includes the identification information 190, the output restriction setter 102 applies an output restriction on the image to be displayed and enables preview display.

For example, as illustrated in FIG. 8, the output may be restricted by pixelating the preview image displayed in a partial area 1811b of a preview image 1811 of the image for printing based on the first print data 181 and displayed on the operation screen 151 of the display 150.

Here, setting to display a preview image 1901 of "Strictly Confidential" being an identification image based on the identification information 190 is performed by the output restriction setter 102.

Further, as illustrated in FIG. 9, in the preview image 1811 of the image for printing, for example, by displaying only the preview image 1901 of "Strictly Confidential" being an identification image indicating a confidential document such as an "Internal Use Only" or "Strictly Confidential" stamp, an output restriction may be performed on the contents displayed in the preview display.

Thus, with the help of the preview image 1811 based on the first print data 181 and the preview image 1901 based on the identification information 190, it is possible to confirm that the image for printing based on the first print data 181 is a document with high confidentiality, but it is not possible to confirm the actual content of the first image data 181.

Processing of Image for Printing Based on Print Data

Next, in the image forming apparatus 10 according to the second embodiment, the processing of the image for printing based on the received print data will be described with reference to a flowchart.

FIG. 10 is a flowchart illustrating an example of an output process of an image for printing based on print data received in the image forming apparatus according to the second embodiment.

Here, in the output process in the image forming apparatus 10, the print data is determined as in the first embodiment, and an output process corresponding to the print data is executed depending on whether the identification information for identifying the confidentiality of the print data is included.

The output, process by the image forming apparatus 10 according to the second embodiment has the same processing steps as the output process in the image forming apparatus 10 of the first embodiment, except that, if the print data 180 includes the identification information 190, an output restriction is set, on a part of the print data 180 to perform a preview display.

Therefore, here, the steps different from the steps of the output process in the image forming apparatus 10 of the first embodiment will be described.

As illustrated in FIG. 10, in the image forming apparatus 10, the print data is received (step S101), and the printing process is executed. The image forming apparatus 10 of the second embodiment is the same as the image forming apparatus 10 of the first embodiment with respect to the processes from steps S101 to S112, steps S113 and S115, and steps S111 to S119.

In the second embodiment, in step S111, if it is determined that the print data 180 includes the identification information 190, the print data 180 is determined to be the first print data 181 with high confidentiality, and a restriction is set on the preview display or printing of the image for printing (step S112). Then, it is determined whether an output restriction is set on a part of the first print data 181 (step S201).

If it is determined in step S201 that an output restriction is set on a part of the first print data 181, the output restriction setter 102 performs output restriction on a part of a preview image of the image for printing based on the first print data 181, and the preview function is executed (step S203). As a result, the preview image 1811 of the image for printing based on the first print data 181, which has a part on which an output restriction is performed, is displayed on the operation screen 151 of the display 150.

On the other hand, if it is determined in step S201 that an output restriction is not set on a part of the first print data 181, the preview function for performing the preview display becomes inexecutable (step S113), and the printing process becomes inexecutable (step S115).

In this way, the output process ends.

According to the second embodiment, in the image forming apparatus 10 configured as described above, even if the received print data 180 includes the identification information 190, the output restriction setter 102 sets an output restriction so that a part with high confidentiality is not clearly displayed in the preview display. As a result, even if the print data 180 selected by the user is the first print data 181 with high confidentiality, the preview display is performed in a restricted manner and thus it is possible to confirm the image for printing without any information leakage.

Third Embodiment

Next, a third embodiment will be described.

In an image forming apparatus according to the third embodiment, in addition to the configuration of the image forming apparatus 10 of the first embodiment, the controller 300 enables only the output operation by a user associated with the first print data 181.

Figure 11:
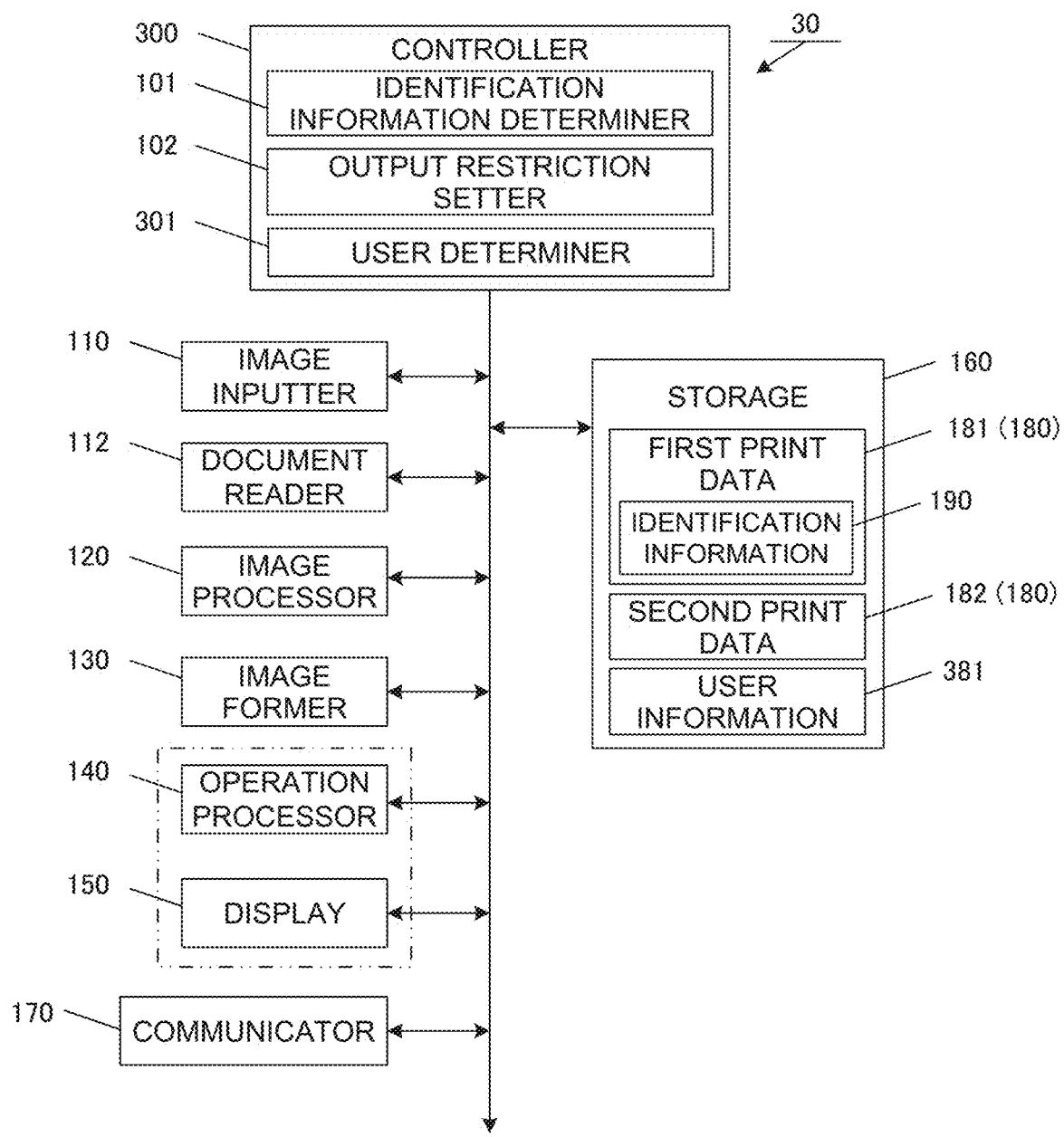
FIG. 11 is a block diagram illustrating a configuration of an image forming apparatus according to a third embodiment.
Figure 12:
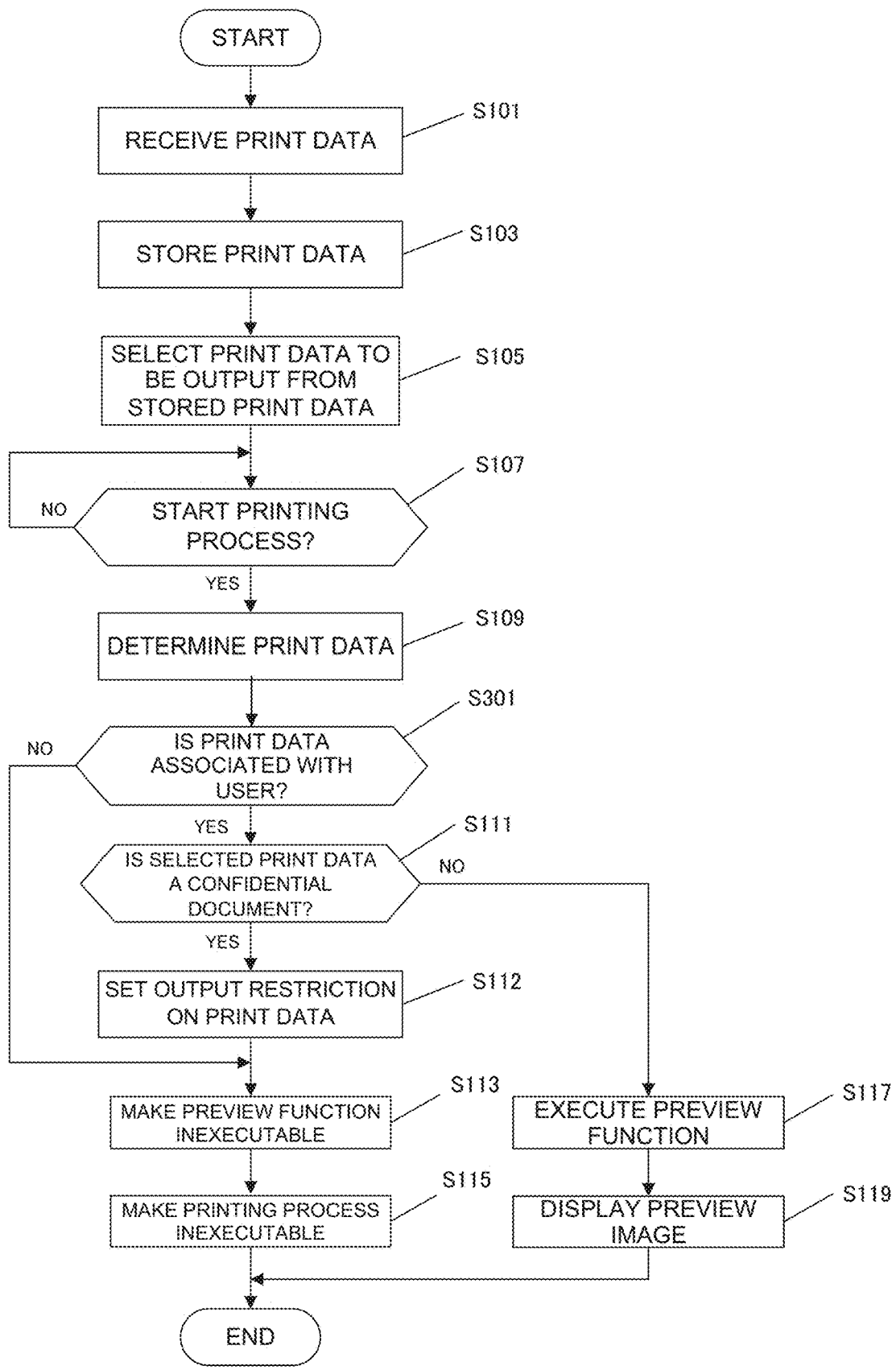
FIG. 12 is a flowchart illustrating an example of an output process of an image for printing based on print data received in the image forming apparatus.

FIG. 11 is a block diagram illustrating a configuration of the image forming apparatus according to the third embodiment, and FIG. 12 is a flowchart illustrating an example of an output process of an image for printing based on print data received in the image forming apparatus.

The image forming apparatus according to the third embodiment has the same configuration as the image forming apparatus 10 of the first embodiment, and therefore, the description will be omitted by referencing the image forming apparatus 10 of the first embodiment.

As illustrated in FIG. 11, in the image forming apparatus 30 according to the third embodiment, the controller 300 includes a user determiner 301, and an output operation is enabled only for a user associated with the first print data 181.

The storage 160 stores the print data 180 and also stores the user information 381 of the user using the image forming apparatus 40. The user information 381 may be user identification information (for example, authentication information) for identifying the user.

In the third embodiment, specific print data to be printed that is received by a user in the image forming apparatus 30 is associated in advance with the user information of the user.

The user determiner 301 determines, based on the print data to be printed and the user information, whether the user performing the printing process and the print data selected by the user are associated with each other.

In the image forming apparatus 30 according to the third embodiment, upon execution of a printing process by a user, the output operation can be performed only if it is determined that the user and the print data to be printed are associated with each other.

Processing of image for Printing Based on Print Data

Next, in the image forming apparatus 30 according to the third embodiment, the processing of the image for printing based on the received print data will be described with reference to a flowchart.

Here, in the output process in the image forming apparatus 30, the print data is determined as in the first embodiment, and an output process corresponding to the print data is executed depending on whether the identification information for identifying the confidentiality of the print data is included.

The output process by the image forming apparatus 30 according to the third embodiment has the same processing steps as the output process in the image forming apparatus 10 of the first embodiment, except that it is determined whether the print data to be printed and an operating user are associated with each other.

Therefore, here, the steps different from the steps of the output process in the image forming apparatus 10 of the first embodiment will be described.

As illustrated in FIG. 12, in the image forming apparatus 30, the print data is received (step S101), and the printing process is executed. The image forming apparatus 30 is the same as the image forming apparatus 10 of the first embodiment with respect to the processes from steps S101 to S109, steps S111 to S115, and steps S111 to S119.

In the third embodiment, in step S109, the selected print data 180 to be printed is determined, and it is determined whether the print data 180 and the user information 381 of the user who selects the print data 180 are associated with each other (step S301).

If it is determined in step S301 that the selected print data 180 and the user information 381 of the user who selects the print data 180 are associated with each other, the identification information determiner 101 determines whether the print data 180 selected by the user is a confidential document including the identification information 190 (step S111).

On the other hand, if it is determined in step S301 that the selected print data 180 and the user information 381 of the user who selects the print data 180 are not associated with each other, the preview function for performing the preview display becomes inexecutable (step S113), and the printing process becomes inexecutable (step S115). In this way, the output process ends.

According to the third embodiment, in the image forming apparatus 30 configured as described above, even in a case where the received print data 180 includes the identification information 190, if the user determiner 301 determines that the user information 381 of the user who executes the printing process and the print data 180 to be printed are associated with each other, the output operation by the user is enabled and the output process can be performed only by that user. As a result, it is possible to prevent information leakage due to preview display or printing performed by another user.

Fourth Embodiment

Next, a fourth embodiment will be described.

In addition to the configuration of the image forming apparatus 10 of the first embodiment, in an image forming apparatus according to the fourth embodiment, the controller 400 includes a password determiner 401, and it is determined whether a password is set for the print data 180 including the identification information 190. If a password is not set for the print, data 180, the output operation to the operation processor 140 is restricted.

In the fourth embodiment, the output restriction setting includes a setting for disabling the output operation to the operation processor 140.

Figure 13:
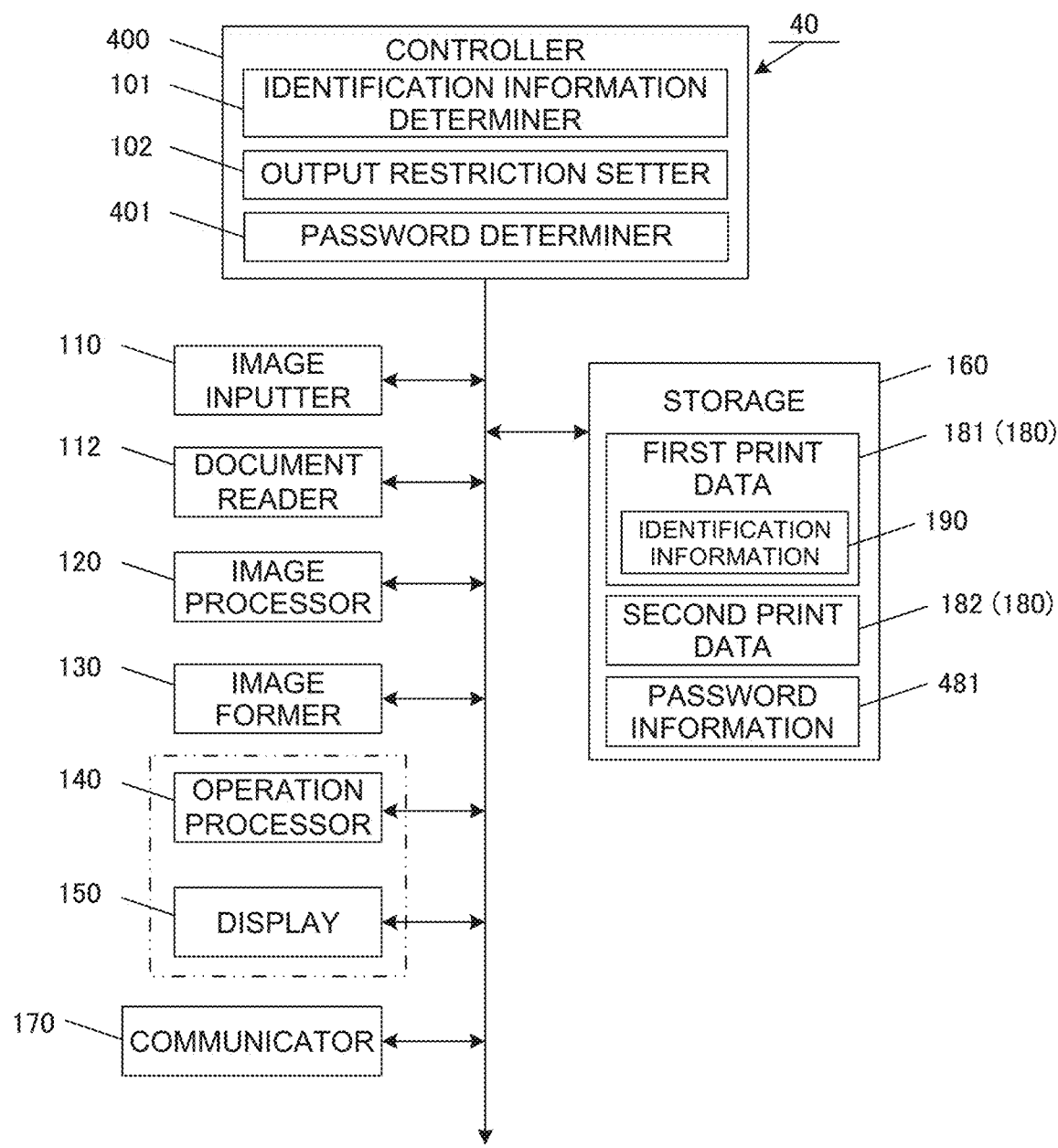
FIG. 13 is a block diagram illustrating a configuration of an image forming apparatus according to a fourth embodiment.
Figure 14:
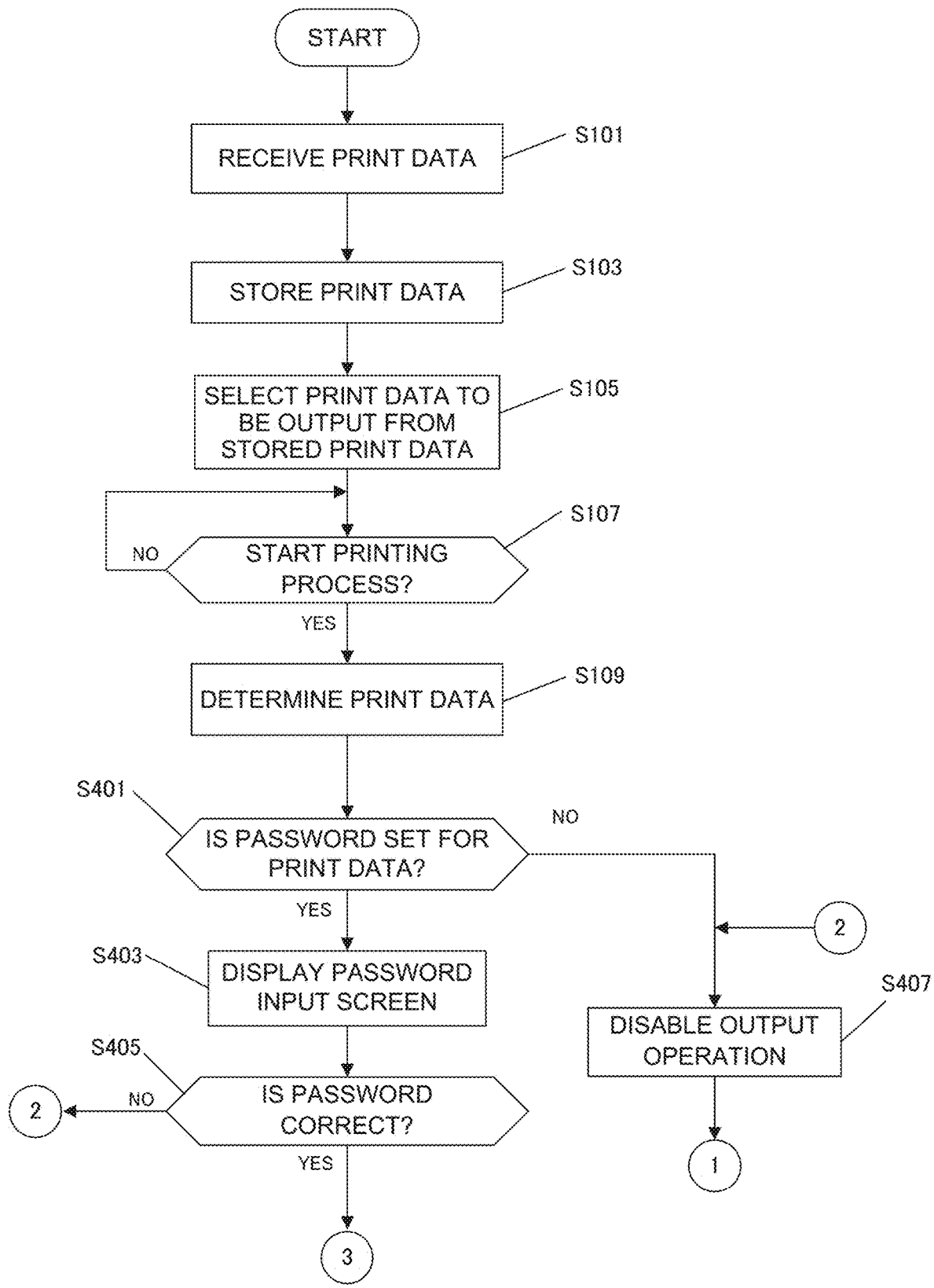
FIG. 14 is a flowchart illustrating an example of an output process of an image for printing based on print data received in the image forming apparatus.
Figure 15:
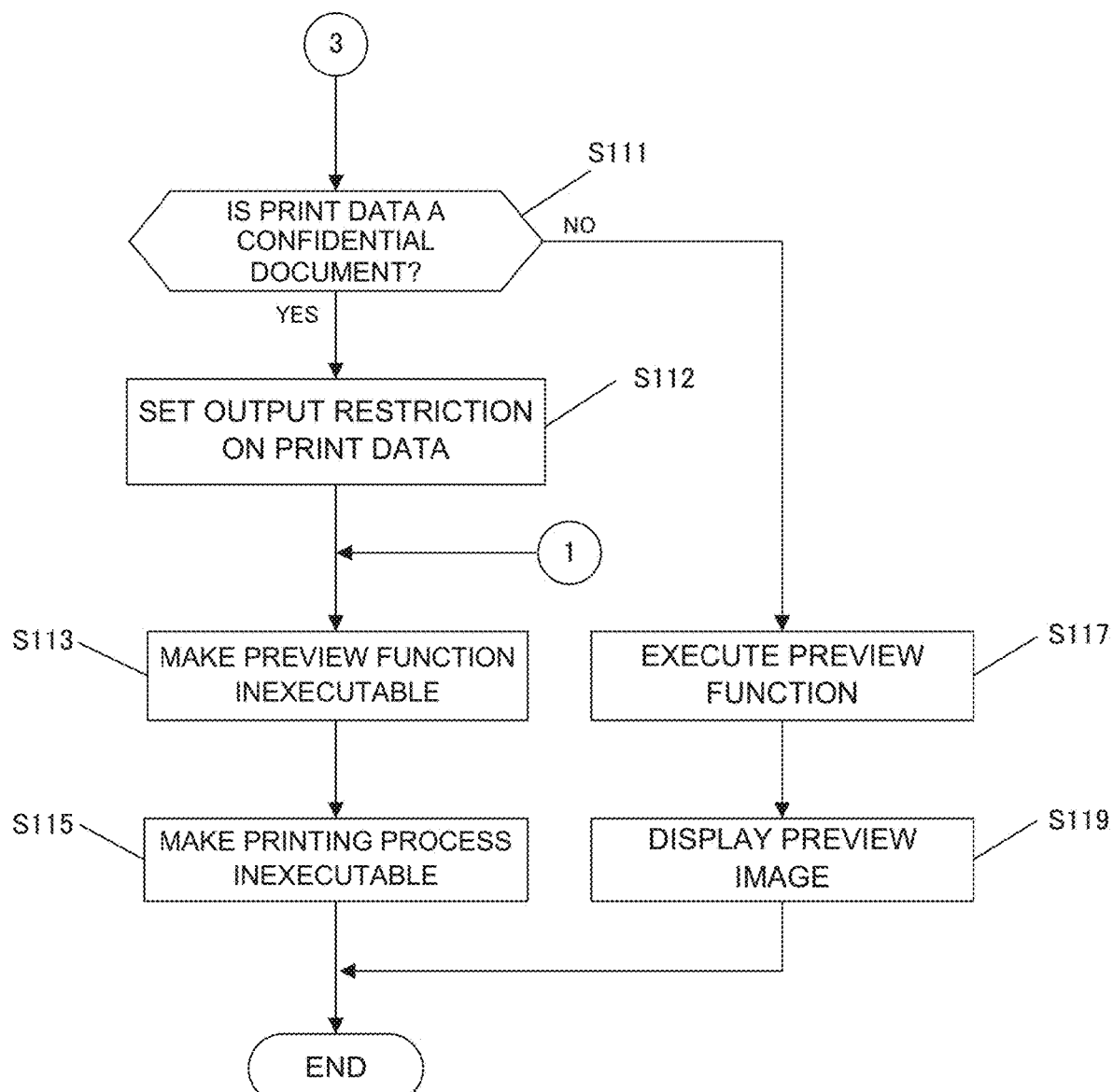
FIG. 15 is a flowchart illustrating an example of an output process of the image forming apparatus in continuation to FIG. 14.

FIG. 13 is a block diagram illustrating a configuration of the image forming apparatus according to the fourth embodiment, FIG. 14 is a flowchart illustrating an example of an output process of an image for printing based on print data received in the image forming apparatus, and FIG. 15 is a flowchart illustrating an example of an output process of the image forming apparatus in continuation to FIG. 14.

The image forming apparatus according to the fourth embodiment has the same configuration as the image forming apparatus 10 of the first embodiment, and therefore, the description will be omitted by referencing the image forming apparatus 10 of the first embodiment.

As illustrated in FIG. 13, in the image forming apparatus 40 according to the fourth embodiment, the controller 400 includes the password determiner 401, and it is determined whether a password is set for the print data 180 including the identification information 190. If a password is not set for the print data 180, the output operation to the operation processor 140 is disabled.

The storage 160 stores the print data 180 and also stores the password information 481 determined by the password determiner 401.

In the image forming apparatus 40 according to the fourth embodiment, upon execution of the printing process by a user, if a password corresponding to the first print data 181 to be printed is input, it is possible to perform the output operation for the first print data 181 to be printed.

Processing of Image for Printing Based on Print Data

Next, in the image forming apparatus 40 according to the fourth embodiment, the processing of the image for printing based on the received print data will be described with reference to a flowchart.

Here, in the output process in the image forming apparatus 40, the print data is determined as in the first embodiment, and an output process corresponding to the print data is executed depending on whether the identification information for identifying the confidentiality of the print data is included.

The output process by the image forming apparatus 40 according to the fourth embodiment has the same processing steps as the output process in the image forming apparatus 10 of the first embodiment, except that a password is set for the first print data 181 including the identification information 190, and the printing process is executed if the password is input.

Therefore, here, the steps different from the steps of the output process in the image forming apparatus 10 of the first embodiment will be described.

As illustrated in FIGS. 14 and 15, in the image forming apparatus 40, the print data is received (step S101), and the printing process is executed. The image forming apparatus 40 is the same as the image forming apparatus 10 of the first embodiment with respect to the processes from steps S101 to S109, steps S111 to S115, and steps S111 to S119.

In the fourth embodiment, the password determiner 401 determines whether a password is set for the selected print data 180 (step S401).

If it is determined in step S401 that a password is set for the print data 180, an input screen for inputting the password is displayed on the display 150 of the image forming apparatus 40 (step S403).

Then, it is determined whether the password entered on the input screen is correct (step S405). If it is determined in step S405 that the password is correct, the processing proceeds to step S111.

On the other hand, if it is determined in step S405 that the password is incorrect, the processing proceeds to step S407, and the output restriction setter 102 sets the instruction based on the output operation in the operation processor 140 to disabled. Then, the processing proceeds to step S113 and step S115, and the output process is not executed.

According to the fourth embodiment, in the image forming apparatus 40 configured as described above, in a case where the received print data 180 includes the identification information 190, if it is determined by the password determiner 401 that a password is not set for the first print data 181 including the identification information 190, the output restriction setter 102 sets the output operation by the user to disabled. As a result, the output process of the highly confidential first print data 181 for which a password must be set becomes inexecutable, and therefore, it is possible to prevent information leakage of highly confidential printing matter.

Fifth Embodiment

Next, a fifth embodiment will be described.

The fifth embodiment is the image forming apparatus 40 of the fourth embodiment in which, if a password is not set for the print data 180 including the identification information 190, the terminal device 11 being the transmission source of the print data 180 including the identification information 190 is requested to cancel the output restriction of the print data 180 including the identification information 190 so that it is possible to execute the output process of the print data 180.

Figure 16:
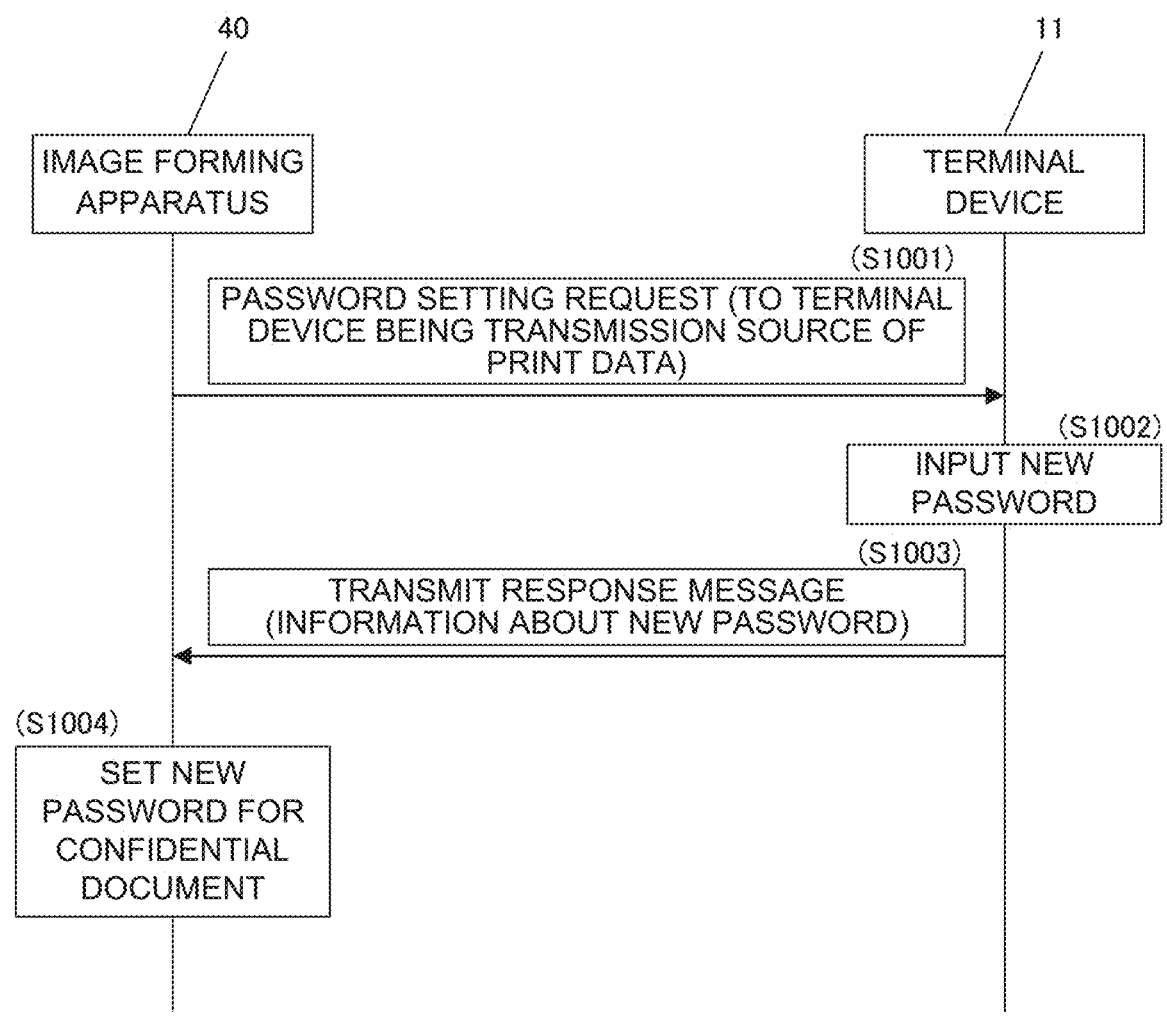
FIG. 16 is a sequence chart illustrating a process of requesting a password from an image forming apparatus according to a fifth embodiment to a terminal device being a transmission source of print data.
Figure 17:
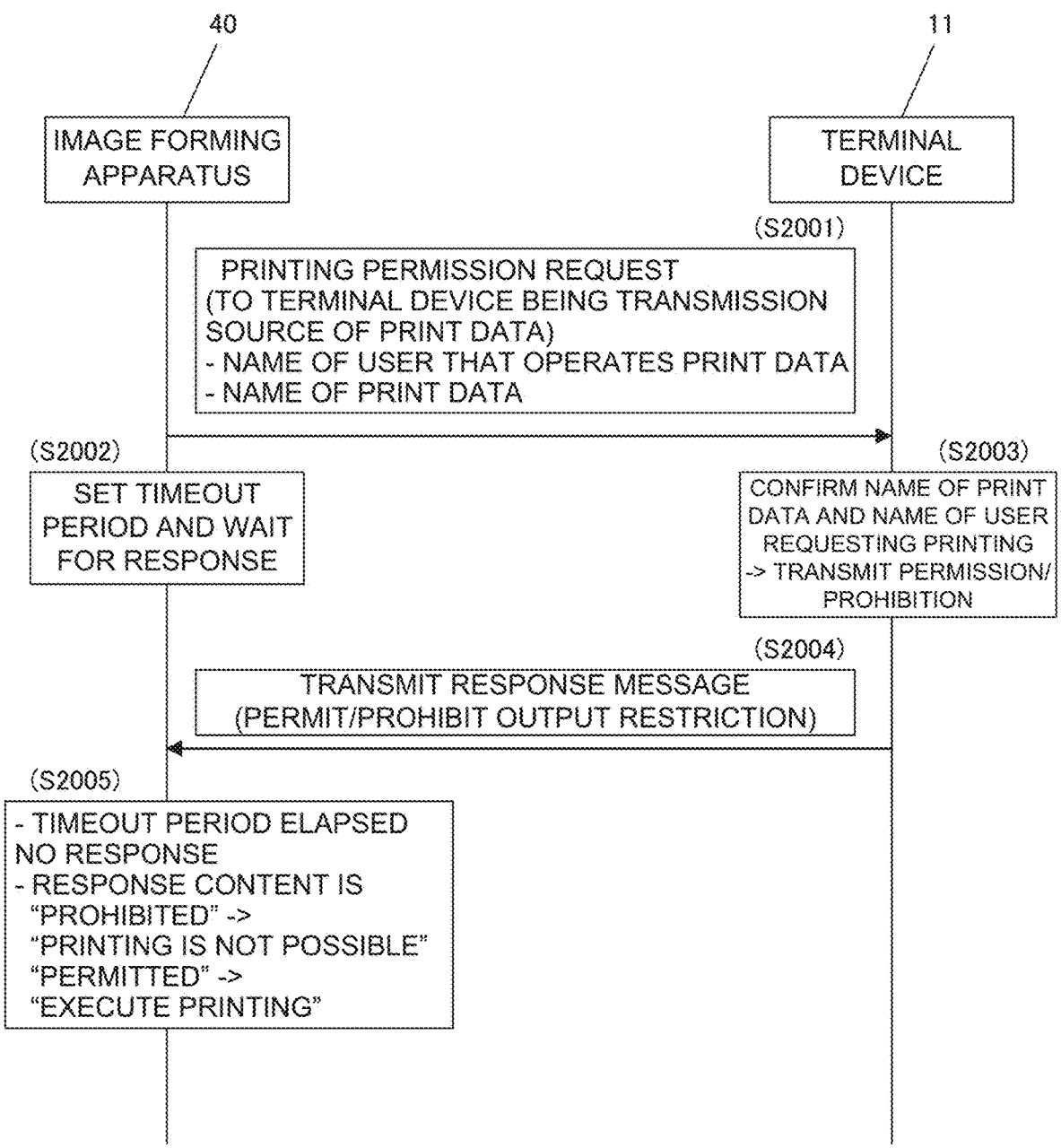
FIG. 17 is a sequence chart illustrating a process of requesting printing permission from an image forming apparatus to a terminal device being a transmission source of print data.
Figure 18:
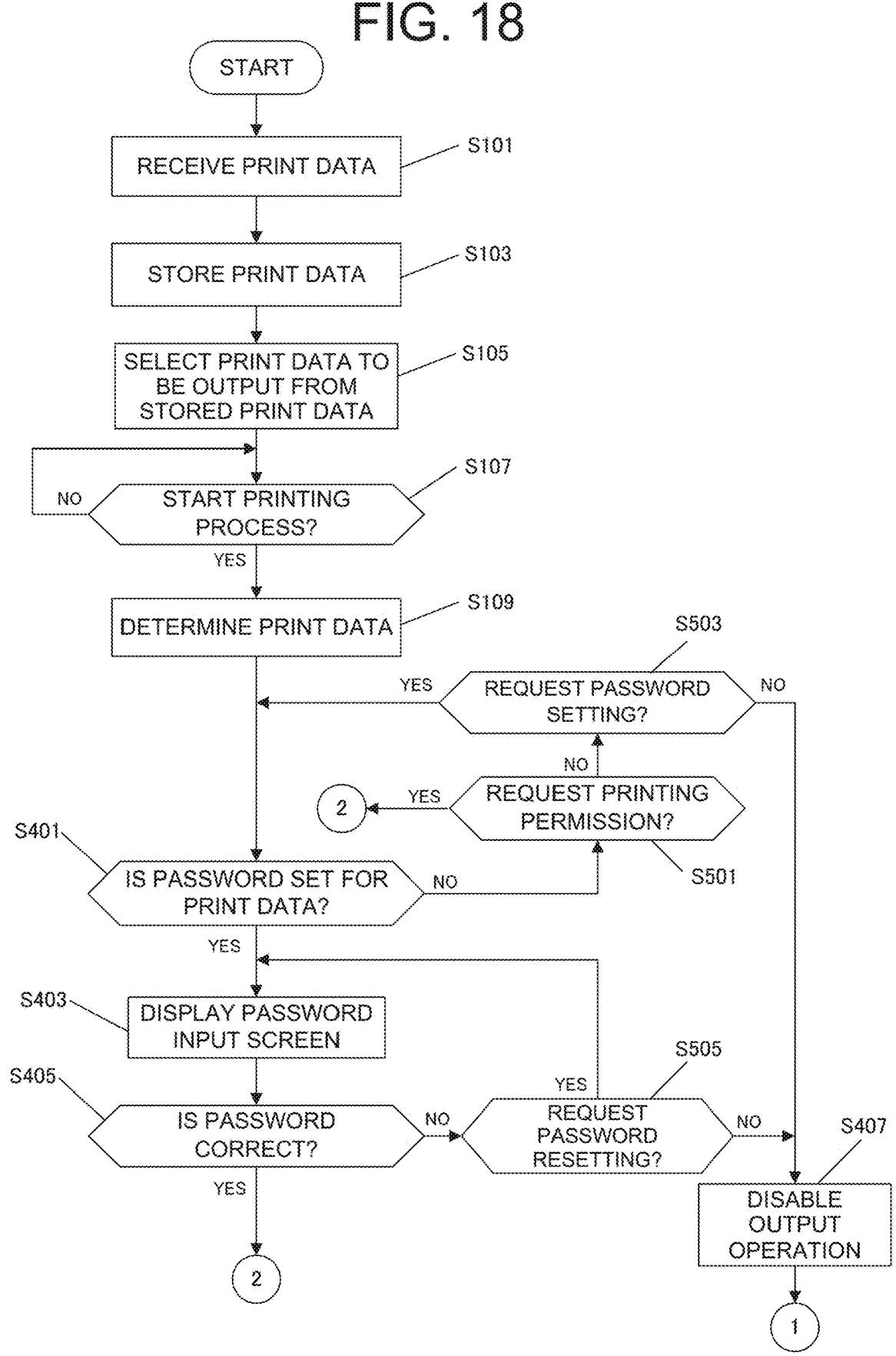
FIG. 18 is a flowchart illustrating an example of an output process of an image for printing based on print data received in the image forming apparatus.
Figure 19:
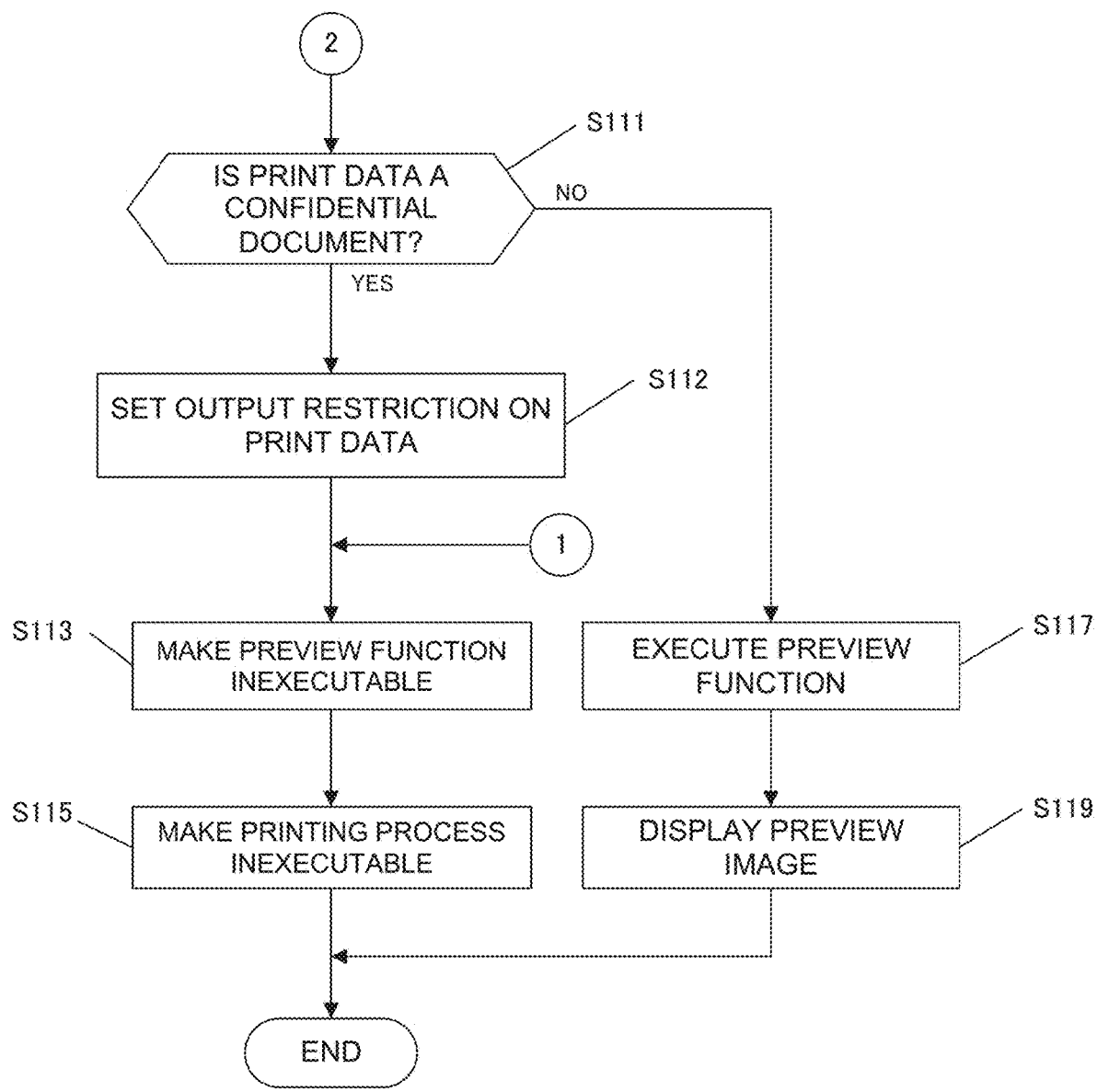
FIG. 19 is a flowchart illustrating an example of an output process of the image forming apparatus in continuation to FIG. 18.

FIG. 16 is a sequence chart illustrating a process of requesting a password from the image forming apparatus according to the fifth embodiment to a terminal device being a transmission source of print data, FIG. 17 is a sequence chart illustrating a process of requesting printing permission from the image forming apparatus to the terminal device being the transmission source of print data, FIG. 18 is a flowchart illustrating an example of an output process of an image for printing based on the print data received in the image forming apparatus, and FIG. 19 is a flowchart illustrating an example of an output process of the image forming apparatus in continuation to FIG. 18.

The image forming apparatus according to the fifth embodiment has the same configuration as the image forming apparatus 40 of the fourth embodiment, and therefore, the description will be omitted by referencing the image forming apparatus 40 of the fourth embodiment.

Case of Requesting Setting of Password for Print Data

In the image forming apparatus 40, as for the print data 180 received from the terminal device 11, if a password is not set for the print data 180 to be printed (the first print data 181) that requires a password, the image forming apparatus 40 requests the terminal device 11 to set a password for the print data 180 to be printed so that it is possible to execute the output process of the print data 180 to be printed.

Here, as illustrated in FIG. 16, the image forming apparatus 40 requests the terminal device 11 to set a new password (S1001).

In the terminal device 11, if the image forming apparatus 40 requests a new password setting, a new password is input (S1002). Then, a response message is transmitted from the terminal device 11 to the image forming apparatus 40, and the information about the new password is transmitted (S1003).

In the image forming apparatus 40, the new password is set for the print data 180 including the identification information 190 (S1004).

Case of Requesting Printing Permission for Print Data

In the image forming apparatus 40, if an output restriction by password setting or the like is applied on the print data 180 received from the terminal device 11, the image forming apparatus 40 requests to the terminal device 11, cancellation of the output restriction and printing permission, so that the output process of the print data 180 to be printed becomes executable.

Here, as illustrated in FIG. 17, a printing permission is requested from the image forming apparatus 40 to the terminal device 11 (S2001). At this time, the name of the user operating the print data 180 with high confidentiality, and the name of the print data 180 are transmitted. The image forming apparatus 40 sets a timeout period and waits for a response (S2002).

If the terminal device 11 receives a printing permission from the image forming apparatus 40, the terminal device 11 confirms the name of the print data 180 and the name of the user requesting printing (S2003). Then, the terminal device 11 transmits a response message indicating whether to permit or prohibit the image forming apparatus 40 to perform printing (S2004).

The printing permission for the print data 180 on which an output restriction is set in the image forming apparatus 40 may be, for example, cancellation of the setting of the password set for the print data 180.

If there is no response message after the timeout period has elapsed, the image forming apparatus 40 may display a "No response" message.

On the other hand, if a response message is received and the response content is "Prohibited", the image forming apparatus 40 may display "Printing is not possible". If the response content is "Permitted", "Execute printing" may be displayed (S2005).

Processing of Image for Printing Based on Print Data

Next, in the image forming apparatus 40 according to the fifth embodiment, the processing of the image for printing based on the received print data will be described with reference to a flowchart.

Here, in the output process in the image forming apparatus 40, the print data is determined as in the first embodiment, and an output process corresponding to the print data is executed depending on whether the identification information for identifying the confidentiality of the print data is included.

The output process by the image forming apparatus 40 according to the fifth embodiment has the same processing steps as the output process in the image forming apparatus 10 of the first embodiment, except that a password is set for the first print data 181 including the identification information 190, and the printing process is executed if the password is input.

Therefore, here, the steps different from the steps of the output process in the image forming apparatus 10 of the first embodiment will be described.

As illustrated in FIGS. 18 and 19, in the image forming apparatus 40, the print data is received (step S101), and the printing process is executed. The output process of the image forming apparatus 40 is the same as that in the fourth embodiment with respect to the processes from steps S101 to S109, step S401, step S403, step S405, step S407, steps S111 to S115, and steps S111 to S119.

In the fifth embodiment, if it is determined in step S401 that a password is not set for the print data 180, it is determined whether to request for a printing permission from the image forming apparatus 40 to the terminal device 11 being the transmission source of the print data 180 (step S501).

If it is determined in step S501 that a printing permission is requested from the image forming apparatus 40 to the terminal device 11 being the transmission source of the print data 180, the printing permission from the terminal device 11 is received, the processing proceeds to step S111, and the output process is executed.

On the other hand, if it is determined in step S501 that a printing permission is not requested from the image forming apparatus 40 to the terminal device 11 being the transmission source of the print data 180, it is determined whether to request the terminal device 11 to set a password (step S503).

That is, in the fifth embodiment, if a password is not set for the print data 180, it is possible to request the terminal device 11 being the transmission source of the print data 180 for an output printing permission or to set a password.

If it is determined in step S405 that the password is incorrect, it is determined whether to request the terminal device 11 to reset the password (step S505).

In the fifth embodiment, it is possible to further request the terminal device 11 being the transmission source of the print data 180 to reset the password.

According to the fifth embodiment, in the image forming apparatus 40 configured as described above, if a password is not set for the print data 180 including the identification information 190, it is possible to request the terminal device 11 being the transmission source of the print data 180 including the identification information 190 for a printing permission or to set or reset the password. Thus, the output restriction set on the print data 180 can be canceled, and the output process of the image for printing based on the print data 180 can be executed.

Therefore, according to the image forming apparatus 40 of the fifth embodiment, in a case where a specific user outputs a document with high confidentiality, even if the output operation is restricted, the terminal device 11 can be requested to cancel the restriction on the output operation to execute preview display and printing process.

Sixth Embodiment

Next, a sixth embodiment will be described.

In the sixth embodiment, in addition to the configuration of the image forming apparatus 10 of the first embodiment, the controller 600 sets an output restriction (for example, a restriction on the output process by a password) in advance on any given information included in the print data 180 to be printed, and stores the setting of the output restriction on the given information in the storage 160.

Figure 20:
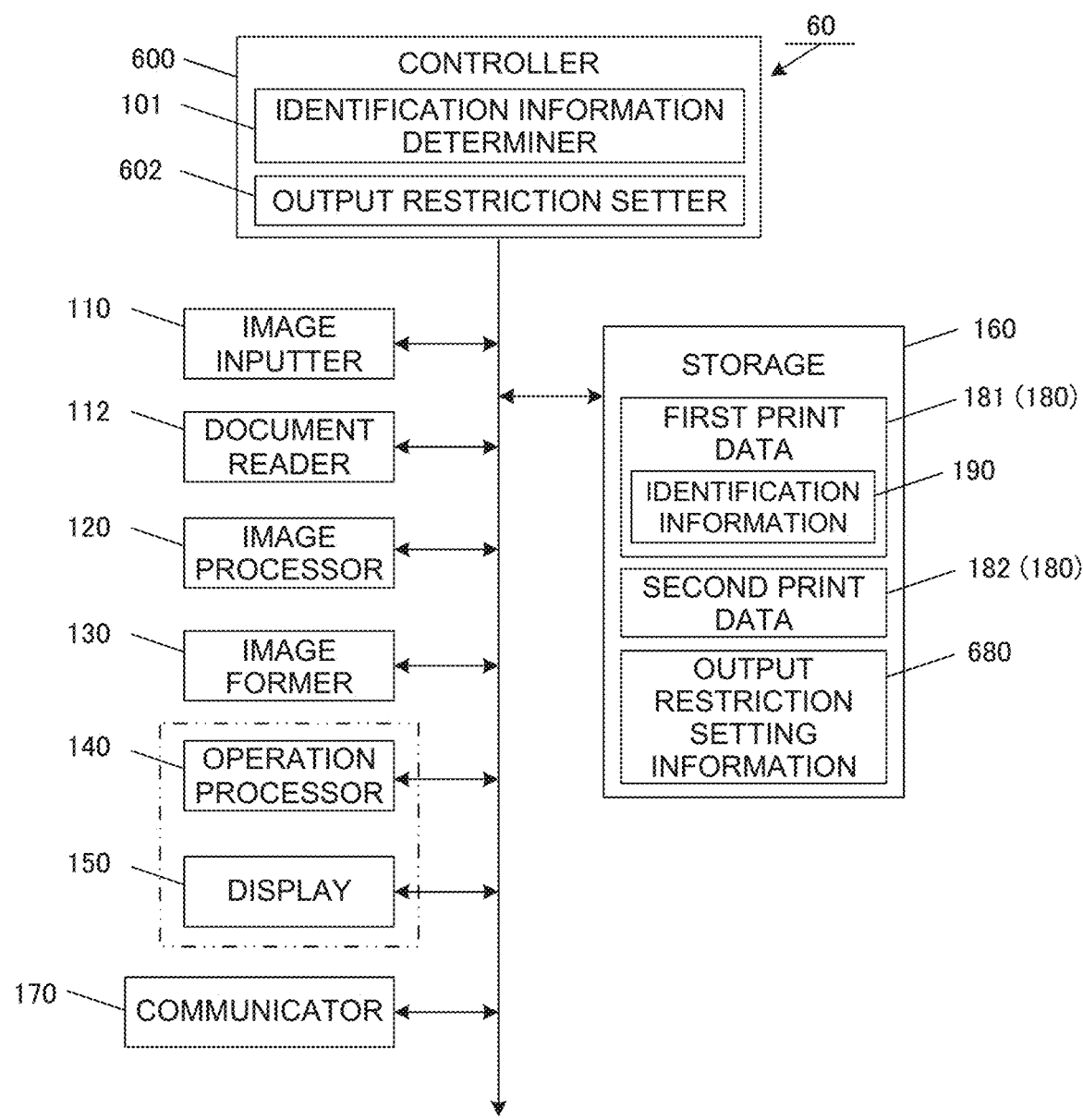
FIG. 20 is a block diagram illustrating a configuration of an image forming apparatus according to a sixth embodiment.

FIG. 20 is a block diagram illustrating a configuration of an image forming apparatus according to the sixth embodiment.

The image forming apparatus according to the sixth embodiment has the same configuration as the image forming apparatus 10 of the first embodiment, and therefore, the description will be omitted by referencing the image forming apparatus 10 of the first embodiment.

In the sixth embodiment, as illustrated in FIG. 20, the controller 600 includes an output restriction setter 602.

In addition to the functions in the first embodiment, the output restriction setter 602 is also capable of setting an output restriction in advance on any given information included in the print data to be printed, for example, any character strings other than the identification information 190, such as "Internal Use Only" and "Strictly Confidential".

In addition to the information about the print data 180 and the identification information 190, the storage 160 stores output restriction setting information 680 set for the given information by the output restriction setter 602.

According to the sixth embodiment, in the image forming apparatus 60 configured as described above, the output restriction setter 602 can set, in advance, an output restriction, such as not allowing display on the display 150, for any character strings other than "Internal Use Only" and "Strictly Confidential", and therefore, it is possible to freely set the character strings or the like for which an output restriction is to be performed. As a result, an output restriction can be freely applied on a part of the image for printing so that it is possible to prevent information leakage of any given information even if it is not a confidential document.

As described above, the present invention is not limited to the above-described embodiments, and various modifications can be made without departing from the scope of the claims. It is obvious that those skilled in the art can conceive variations or modifications included in the scope of claims. In other words, the technical scope of the present invention includes embodiments implemented as combinations of technical means modified as appropriate without departing from the spirit of the present invention.

What is claimed is:

1. An image forming apparatus, comprising:
   a controller, a storage, and a display,
   upon output of an image for printing based on print data, the controller storing the print data in the storage and selectively outputting an image for printing, and if the print data includes identification information for identifying the image for printing, the controller outputting the identification information together with the image for printing, wherein:

when an image for printing based on print data selected by a user is displayed on the display, the controller restricts an output process so that the image for printing based on the print data is displayed only if the identification information is not included in the print data selected by the user, wherein the image forming apparatus further comprising an operation processor for a user to operate the image forming apparatus, wherein:

if a password is not set for the print data including the identification information, the controller restricts an output operation for the operation processor, and the controller requests the transmission source of the print data including the identification information to cancel the restriction on the output operation.

2. The image apparatus according to claim 1, wherein, if print data to be selected includes the identification information, the controller restricts the output process of at least a part of the image for printing based on the print data.

3. The image forming apparatus according to claim 1, further comprising an operation processor for a user to operate the image forming apparatus, wherein the controller enables only an output operation for the operation processor by a user associated with the print data.

4. The image forming apparatus according to claim 1, wherein the controller sets an output restriction in advance on any given information included in print data to be printed, and stores, in the storage, the setting of the output restriction on the given information.

5. An image forming method, comprising, in outputting of an image for printing based on print data:

storing the print data in a storage, outputting the image for printing based on the print data selected by a user; and if the print data includes identification information for identifying the image for printing, outputting the identification information together with the image for printing, wherein the image forming method further includes, when the image for printing based on the print data selected by the user is displayed on a display, restricting output so that the image for printing based on the print data is displayed only if the identification information is not included in the print data selected by the user, wherein if a password is not set for the print data including the identification information, the controller restricts an output operation for the operation processor, the controller requests the transmission source of the print data including the identification information, to cancel the restriction on the output operation.

* * * * *